2,891,028

POLYMERS OF VINYLIDENE MONOMERS, DESTATICIZED WITH N,N,N',N' TETRAKIS (2-HYDROXYPROPYL) ETHYLENE DIAMINE

Myron A. Coler, Scarsdale, and Arnold S. Louis, Riverdale, N.Y.

No Drawing. Application March 30, 1956
Serial No. 574,947

12 Claims. (Cl. 260—32.6)

This invention relates to improved synthetic resin molding compositions and, in particular, to such molding materials which avoid the highly undesirable effects of electrostatic charge build-up during the molding operation, and method of making same.

It has been found that the process of molding certain synthetic resins causes the generation of high electrostatic charges. This evidences itself frequently by the formation of "crows feet," "fern-like," and "zig-zag" patterns through the attraction of fine dust particles from the atmosphere. Such patterns are sometimes erroneously interpreted as being molding flaws.

The literature discloses many additives for rendering synthetic resins destaticized. Many of such additives depend on the property of deliquescence to cause the article to be wetted by moisture from the air. The moisture renders the surface of the article sufficiently conductive to prevent the further accumulation of electrostatic charges. Molding operations are normally carried out at temperatures substantially in excess of the boiling point of water, and therefore, as molded, the molded article is moisture free and thus subject to the accumulation of electrostatic charges at the time of molding.

Still other additives which are inherently destaticizing agents tend to undesirably affect the physical properties of the plastic. For example, a lowering of the heat distortion point may occur, there may also be a change in color, gloss, hardness or water absorption, or blemishes may result from decomposition of additives or evaporation of low boiling fractions. The resulting product may also become toxic if the additive is in itself toxic. Color is an important factor because a sizeable volume of the synthetic resins produced reaches the consumer in a clear or tinted transparent form. It may be appreciated that but few materials are so compatible with clear plastics such as polystyrene that they may be incorporated without affecting the clarity or color of the molded plastic.

Our invention, disclosed hereinafter provides a plastic composition which avoids the disadvantages of acquiring electrostatic charges and, in particular, which is not susceptible to electrostatic charging during the molding operation. This invention does not depend on deliquescent action and therefore produces results substantially independent of humidity. This advantage of this invention is important in the elimination of dust patterns from freshly molded plastic articles.

We have found that a particular additive, N,N,N',N' tetrakis (2-hydroxypropyl) ethylenediamine, (referred to hereinafter as "the additive") which is a highly polar compound, is compatible with polystyrene which is but slightly polarized. That the materials are so compatible as not to destroy the clarity and transparency of the plastic is an interesting result in view of the difference in polarization. By incorporating the above mentioned additive in polystyrene the desired destaticizing properties are attained without incurring any of the undesirable features enumerated above. The quantity of additive employed is between 1 and 7 percent by weight of the total and preferably between 3 and 6 percent. The upper limit is a matter of choice dictated by considerations of economy and is not critical. For example, 10 percent or more may be used and the desired destaticizing results obtained. Although at higher concentrations there is danger of affecting physical properties adversely.

A totally unexpected advantage of the above named additive was discovered during molding tests of material prepared in accordance with this invention. It was found that the additive improved flow properties of the base plastic so as to permit shorter molding cycles as well as improved filling of thin mold sections, reduced breakage of thin-walled moldings and easier mold release.

An object of this invention is therefore to provide a method for eliminating the formation of electrostatic charges on molded plastic articles.

Another object is to provide a plastic molding composition having improved molding properties, and a method of making same.

Still another object is to provide a plastic molding composition having preferred flow properties when injection molded.

A particular object is to provide a transparent plastic material which is substantially non-susceptible to acquiring electrostatic charges.

A particular object of this invention is to provide a method for eliminating the formation of electrostatic charges on molded plastic articles during the molding operation.

Another object is to provide articles comprising polystyrene compositions which are free of the effects of electrostatic charges.

Another object is to provide a polystyrene molding composition suitable for molding transparent articles free from the effects of electrostatic charges.

Still another object of this invention is to provide an improved plastic composition.

A still different object is to reduce the electrostatic charge on polystyrene objects made by injection molding.

A further object of this invention is to provide a polystyrene composition of superior molding properties.

Further objects and advantages will become apparent and still others will be pointed out with particularity as the following detailed description proceeds.

In order to illustrate the invention specific examples are provided hereinafter. It is to be understood that they are not to be regarded as limiting in any way but merely illustrative.

*Example 1*

0.5 pound of the additive, as supplied by Wyandotte Chemical Company under their trademark "Quadrol" was dissolved in one pound of isopropyl alcohol. 9.5 pounds of Monsanto Chemical Corporation L2020 PIX-6 polystyrene granules having a particle size ranging from about 60 to 10 mesh, were then thoroughly mixed with the solution. The alcohol was then evaporated in an exhaust oven at 65° C. for 36 hours with occasional agitation so as to leave the polystyrene granules uniformly coated with said additive.

The coated material was then fed through a Windsor type RC-65 twinscrew extruder equipped with a series of ⅛" square orifices. The die was maintained at 400° F. The extruded material was chopped up into molding granules.

Whereas the coated granules were sticky to the touch, the chopped granules were dry and free flowing and indistinguishable from untreated polystyrene molding chips.

The molding granules were injection molded on a Reed-Prentice 8 ounce injection molding press with a heater temperature of 600° F. The resulting articles were promptly sprayed with fine bentonite dust by means of a hand sprayer. The dust did not collect in patterns or charged areas. Additional moldings were set aside and observed periodically for several weeks. The absence of dust patterns was noted. Using a Keithley electrostatic voltmeter, a potential of less than one volt was measured between a molding and ground immediately after withdrawal from the mold.

As a control means identical articles were molded from the same polystyrene not using the additive. One control article was sprayed with the bentonite dust immediately after molding and a well defined fern-like pattern was immediately apparent. The same control article yielded a 20 volt reading on the electrostatic voltmeter upon removal from the mold. After long term storage another unmodified polystyrene molding showed definite dust patterns whereas the modified polystyrene article showed but few isolated gravity deposited grains.

The molding characteristics of the modified polystyrene was judged to be superior to that of the control or unmodified polystyrene by the molding machine operator on the basis of obviously improved ease of mold release and lower breakage of thin-walled moldings.

*Example 2*

The procedure of Example 1 was repeated with the exception that 0.01 gram/pound of phthalocyanine blue was suspended in the alcohol and put through a colloid mill together with the additive prior to incorporation into the polystyrene. The resulting molded product was an attractive clear transparent blue color.

When tested as in Example 1 the molding and destaticizing characteristics were found to be identical to the treated product of Example 1.

*Example 3*

2.0 pounds of isopropyl alcohol and 0.3 pounds of the additive were mixed together to form a solution of watery consistency. The foregoing mixture was worked in a sigma blade mixer with 9.7 pounds of the same polystyrene as employed in Example 1. After 10 minutes the particles were found to be coated with the additive. The coated particles were then dried at 65° C. for 24 hours to remove the alcohol. The coated particles were then put through the extruder, chopped and molded as in Example 1. The resulting products showed the same properties as the modified compositions of Example 1.

*Example 4*

0.6 pound of the additive and 9.4 pounds of the polystyrene were thoroughly mixed in a sigma blade mixer. The mixture was then extruded, chopped and molded as in Example 1. The molded articles showed no discernible electrostatic charge as measured on the Keithley meter. The molded articles showed no tendency to collect dust in patterns during the storage test.

*Example 5*

Example 4 was repeated with an additive concentration of 1% by weight of the total. The resulting molding exhibited poor non-electrostatic properties, as measured by the Keithley voltmeter. A small amount of dust was collected in patterns after storage for two weeks.

*Example 6*

The procedure of Example 4 was repeated with an extruder die temperature of 375° F. utilizing polymethylmethacrylate as supplied by E. I. DuPont de Nemours & Company, Incorporated as the resinous polymer. The resultant molding was cloudy and exhibited excellent antistatic properties. The voltmeter reading of a freshly molded article was only 2 volts.

*Example 7*

The procedure of Example 4 was repeated with an extruder die temperature of 350° F. utilizing ⅛ inch polyethylene pellets as supplied by E. I. DuPont de Nemours & Company, Incorporated as the resinous polymer. The resultant molding had substantially the same appearance as an unmodified control molding and exhibited excellent non-static and molding properties. The Keithley voltmeter reading was 0.4 volt directly after the molding operation.

*Example 8*

The procedure of Example 4 was repeated using 0.6 pound of additive, 9.4 pounds of polyvinylchloride and a die temperature of 390° F. The resulting molded articles were similar in appearance to unmodified polyvinylchloride and exhibited excellent molding and antistatic properties. The electrostatic voltmeter test yielded a reading of about 2 volts whereas untreated polyvinylchloride showed a reading of 20 volts upon molding.

*Example 9*

The procedure of Example 1 was repeated using so-called high impact polystyrene which is a plastic alloy of polystyrene and butadiene.

The molded product was compared with a control specimen prepared in identical fashion with the exception that the additive was omitted. The two specimens were opaque in appearance. Immediately after molding the treated material showed a charge of 0.4 volt whereas the unmodified control showed a charge of 3 volts.

Of particular note was the retention of the highly desired toughness of the unmodified material.

*Example 10*

The modified polystyrene and unmodified polystyrene of Example 1 were tested to determine their relative flow properties. A Bakelite Flow Tester (Tinius Olsen Testing Machine Company) was utilized as per ASTM D569-48. The procedure was to determine the flow in inches as recorded by the flow tester at 135° C. after an elapsed time of two minutes. A pressure of 500 p.s.i. was used.

The temperature was maintained at 135° C.±0.5° C. for each sample. Prior to testing, the samples were conditioned for 24 hours at 120° F. and allowed to cool in a desiccator for four hours.

The flow of the unmodified polystyrene was 0.92 inch average for two tests whereas the modified polystyrene showed an average flow of 1.31 inches for a two minute flow test.

Thus far a number of examples have been given which illustrate procedures which are particularly advantageous where chipped or extruded plastic is to be mixed with the additive or where the method of polymerization in use does not suit the methods of incorporation to be described hereinafter. For most purposes the procedure of Example 4 is preferred for its simplicity and lack of a separate drying operation. Where a pigment is to be added the method of Example 2 is preferred. This method is claimed in our copending application entitled "Process for Making Plastic Compositions," Serial Number 532,132, filed September 2, 1955.

Among the foregoing and following examples several suitable methods of incorporation are described. The sole critical feature appears to be the requirement that the additive be uniformly dispersed.

In plants where bulk polymerization is practiced, the procedure of Examples 13 and 14 will be preferred as eliminating several later steps.

Be it observed that it will often be advantageous to prepare a master-batch of resin with incorporated additive said master-batch containing far more additive than is recommended for use in molding operations, and being later cut back by extrusion or by being otherwise blended with untreated resin. Such a concentrate may well be sold, particularly in the "clear" or "natural" color for blending with untreated resin of various colors or of its own color. For preparing such masterbatches the methods of Examples 12 and 14 are preferred. The masterbatch may contain up to 50% additive.

Example 11

50 grams of the additive dissolved in 75 grams of water were incorporated with 666 grams of polystyrene emulsion containing 30% polystyrene solids.

760 grams of granulated polystyrene were placed in a Baker-Perkins mixer. With the mixer in operation, the polystyrene emulsion additive mixture was slowly added. The resultant slurry was then dried at 65° C. for 48 hours at which time it was found to be water-free. The resultant mixture which contained 5% of the additive when molded as in Example 1, yielded moldings which when tested as in Example 1, exhibited destaticized characteristics similar to the modified product of Example 1.

Example 12

40 grams of the additive dissolved in 40 grams of water were added to 400 grams of a 30% solids polystyrene emulsion. This mixture was spray-dried to give a free flowing polystyrene powder containing one part of the additive to three parts of polystyrene. The resultant concentrate was later tumbled with 840 grams of a granulated polystyrene. The resultant blend was injection molded under conventional polystyrene molding conditions and yielded destaticized moldings having properties comparable to those produced by the procedures of Example 1.

Example 13

2.4 grams of α,α' azodiisobutyronitrile was dissolved in 960 grams of monomeric styrene, 60 grams of the additive were dissolved in the styrene and the solution was placed in a heated reaction kettle into which nitrogen was bubbled. The solution was heated at 70° C. for 1½ hours until an exothermic reaction took place. The reaction was continued for an additional 30 minutes during which the temperature was gradually increased to 90° C.

Considerable polymerization took place as evidenced by an increase is viscosity. The mixture was transferred to air-free containers which were then sealed. The containers were maintained at a temperature of 90° C. for 48 hours. The resulting polymer was extruded, chopped and injection molded under normal polystyrene molding conditions. Moldings were clear and in all respects comparable to those of Example 4.

Example 14

2.0 grams of α,α', azodiisobutyronitrile were dissolved in 800 grams of monomeric styrene, 200 grams of the additive were dissolved in the styrene and the solution was placed in a heated reaction kettle into which nitrogen was bubbled. The solution was heated at 70° C. for 1½ hours until an exothermic reaction took place. The reaction was continued for an adidtional 30 minutes during which the temperature was gradually increased to 90° C. Considerable polymerization took place as evidenced by an increase in viscosity. The mixture was transferred to air-free containers which were then sealed. The containers were maintained at a temperature of 90° C. for 48 hours. The resultant polymer was extruded and chopped into granules. Later 300 grams of the granules were mixed with 700 grams of untreated polystyrene molding compounds and extruded, chopped, and injection molded under normal conditions for polystyrene. The quality of the resulting moldings was in all respects equal to that of the moldings of Example 1.

Thus we have disclosed that by incorporating a minor proportion of N,N,N',N' tetrakis (2-hydroxypropyl) ethylenediamine in thermoplastic synthetic resins many advantages are obtained such as improved molding properties and freedom from the formation of electrostatic charges. In combination with polystyrene, clear transparent products are obtained.

For the purpose of illustrating the invention, examples have been shown of the application of our invention to plastic alloys of polystyrene, polyethylene, polyvinylchloride and polymethylmethacrylate and their copolymers. We wish it to be understood that the invention likewise may be utilized in treating others such as polyacrylonitrile, polyfluoroethylene, polytrifluoromonochloroethylene, polybutadiene, halogenated polystyrenes, and mixtures and copolymers of these materials.

The term "vinylidene" as used herein is intended to define monomers containing a polymerizable unsaturated ethylenic

structure and is generic to vinyl and vinylidene monomers. Each of the polymers specifically exemplified in the preceding examples, namely: polystyrene, polymethylmethacrylate, polyvinyl chloride and polyethylene is a polymer of a vinylidene monomer, so defined.

By "plastic alloy" as used herein we intend to encompass compositions comprising two or more types of polymeric molecules whether prepared by copolymerization or simple mixture.

Several examples have been given herein of suitable methods of incorporating the additive. The sole critical feature appears to be the requirement that the additive be uniformly dispersed.

While we have disclosed what is at present considered the best mode for carrying out our invention we appreciate that it will be obvious to those skilled in the art that various changes and modifications may be made therein without departing from the invention, and it is, therefore, aimed in the appended claims to cover all such changes and modifications as fall within the true spirit and scope of the invention.

This application is a continuation in part of our co-pending application entitled "Non-Electrostatic Plastic Articles" Serial No. 532,131 filed September 2, 1955 which was abandoned in favor of the present application.

What is claimed is:

1. A composition of matter consisting of a polymer of a vinylidene monomer and an antistatic agent consisting of from 1% to 7% by weight of N,N,N',N', tetrakis (2-hydroxypropyl) ethylene diamine.

2. The composition of claim 1 wherein said polymer is polyvinylchloride.

3. The composition of claim 1 wherein said polymer is polymethylmethacrylate.

4. The composition of claim 1 wherein said polymer is polyethylene.

5. The composition of claim 1 wherein said polymer is a mixture of butadiene polymer and polystyrene.

6. A composition of matter consisting of a polymer of a vinylidene monomer and an antistatic agent consisting of from 3% to 6% by weight of N,N,N',N', tetrakis (2-hydroxypropyl) ethylene diamine.

7. The composition of claim 6 wherein said polymer is polyvinylchloride.

8. The composition of claim 6 wherein said polymer is polymethylmethacrylate.

9. The composition of claim 6 wherein said polymer is polyethylene.

10. The composition of claim 6 wherein said polymer is a mixture of butadiene polymer and polystyrene.

11. A composition for molding transparent plastic articles consisting of polystyrene and from 1 to 7% by weight of N,N,N',N', tetrakis (2-hydroxypropyl) ethylene-diamine based on the weight of the composition.

12. A composition for molding transparent plastic articles consisting of polystyrene and from 3 to 6% by weight of N,N,N',N', tetrakis (2-hydroxypropyl) ethylenediamine based on the weight of the composition.

References Cited in the file of this patent

UNITED STATES PATENTS

| | | |
|---|---|---|
| 2,450,552 | Hurdis | Oct. 5, 1948 |
| 2,452,669 | Levine | Nov. 2, 1948 |
| 2,697,118 | Lundsted et al. | Dec. 14, 1954 |